March 12, 1957 D. T. AYERS, JR 2,784,702
FLUID PRESSURE OPERATED MOTOR
Original Filed Feb. 15, 1955 3 Sheets-Sheet 3
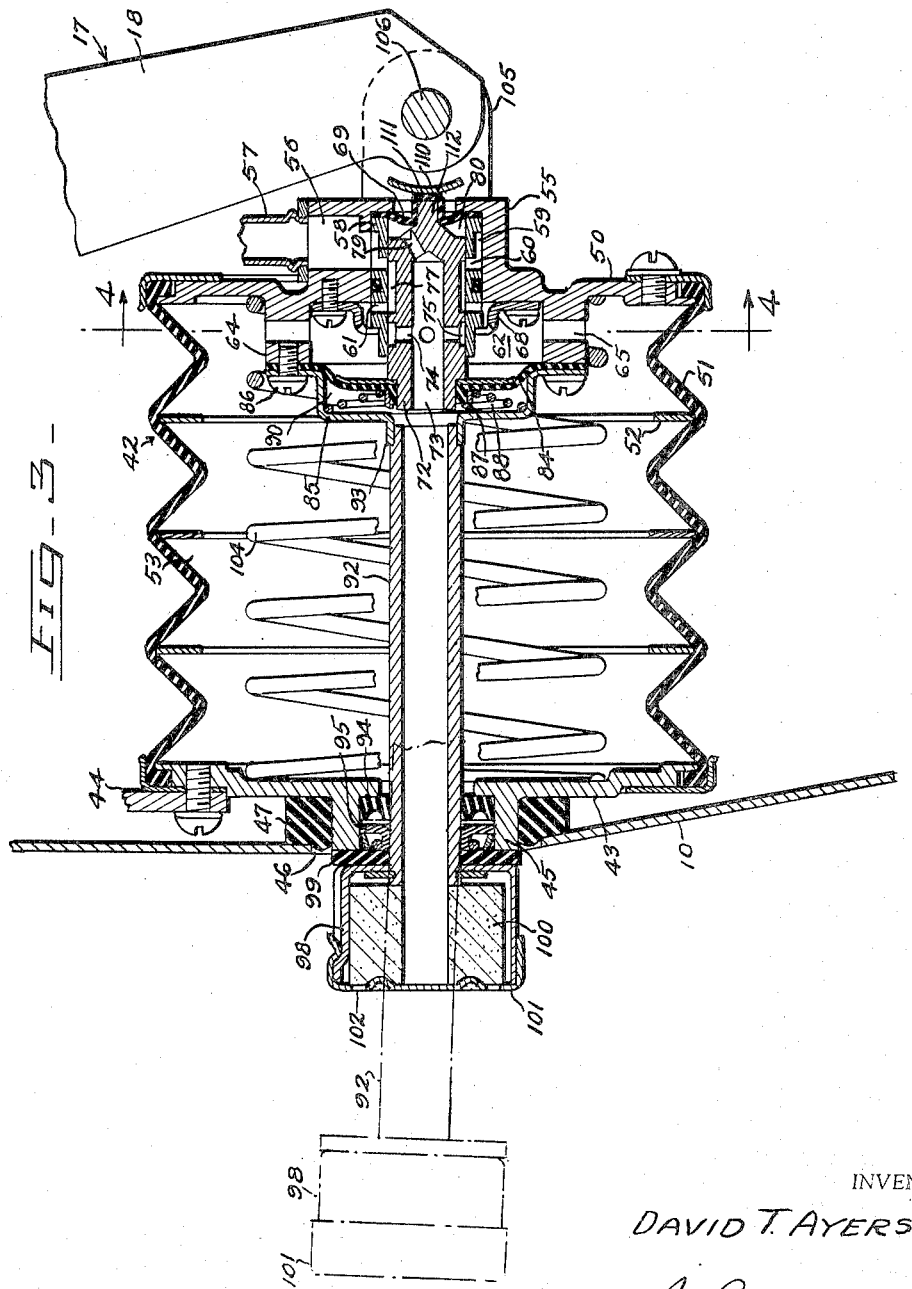
INVENTOR
DAVID T. AYERS JR.
BY
ATTORNEY

# United States Patent Office 2,784,702
Patented Mar. 12, 1957

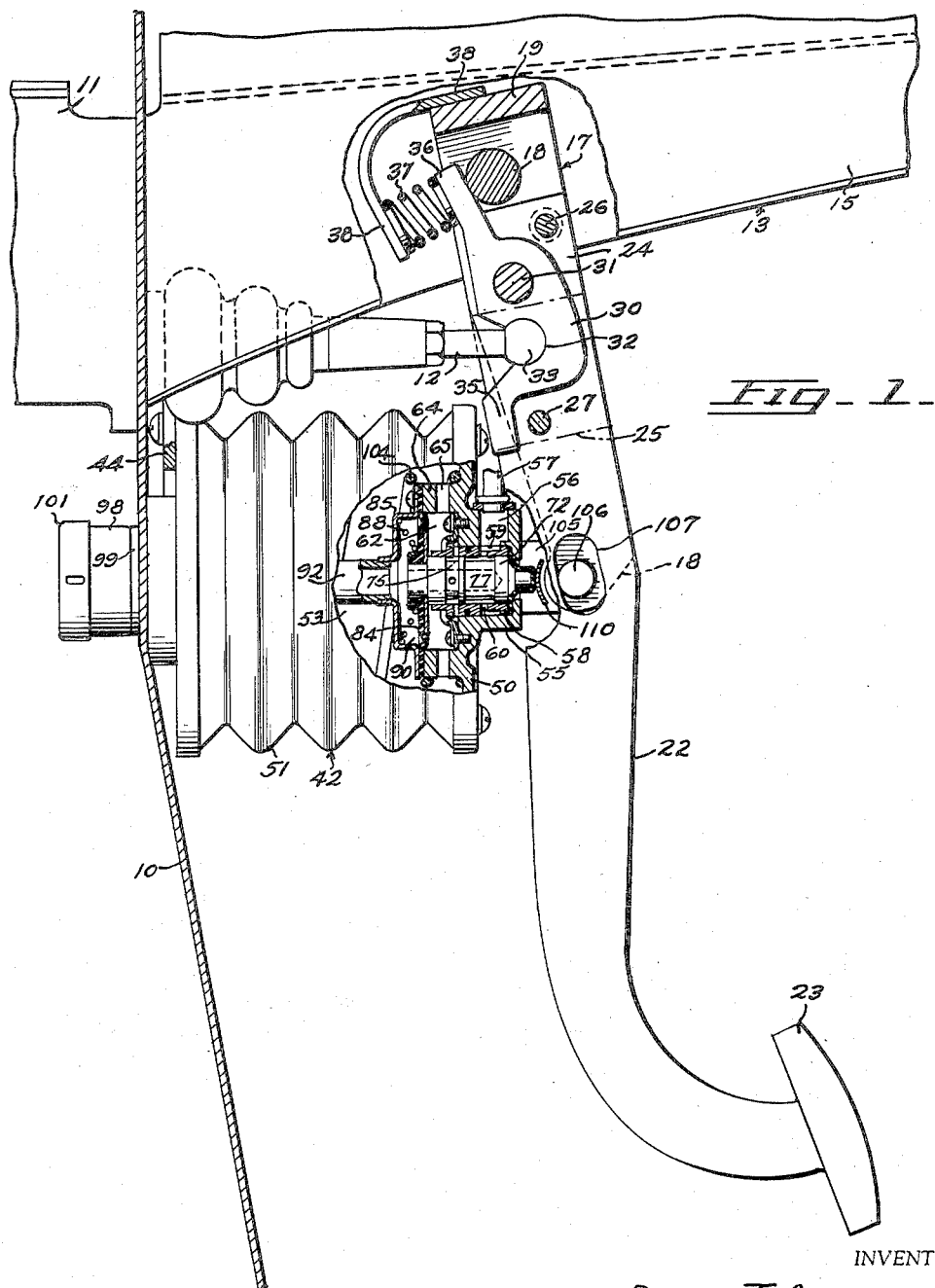

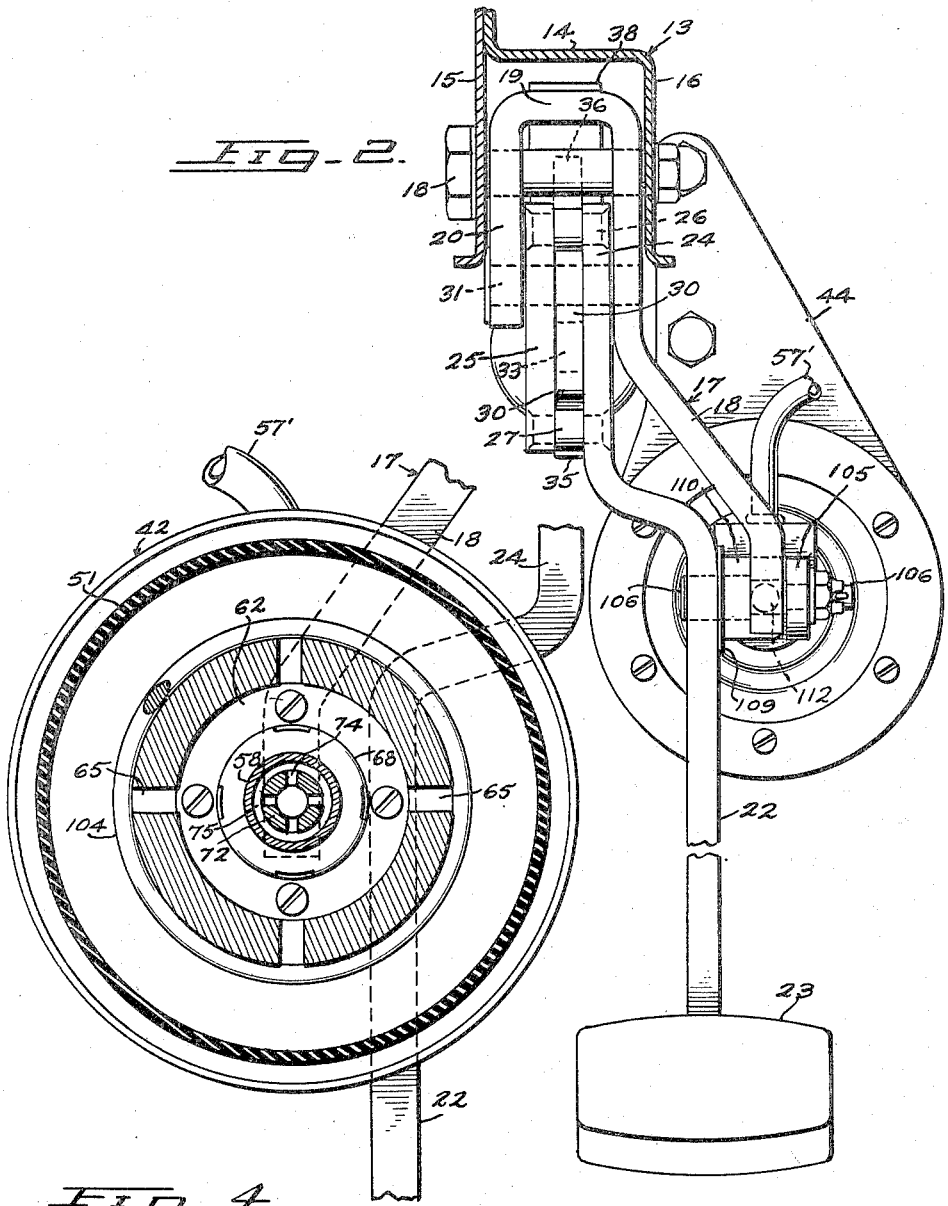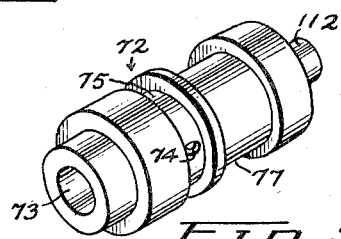

2,784,702

FLUID PRESSURE OPERATED MOTOR

David T. Ayers, Jr., Birmingham, Mich., assignor to Kelsey-Hayes Company, Detroit, Mich., a corporation of Delaware Original application February 15, 1955, Serial No. 488,185. Divided and this application March 14, 1955, Serial No. 494,149

13 Claims. (Cl. 121—41)

This invention relates to a fluid pressure operated motor and is a division of my copending application Serial No. 488,185, filed February 15, 1955.

In my copending application referred to I have disclosed a booster brake mechanism for motor vehicles wherein a novel type of booster motor mechanism is employed and is operable by and in conjunction with a novel type of pedal and lever mechanism to provide pedal operation having highly desirable characteristics. Aside from its use in a booster brake mechanism, the novel motor referred to is capable of application in other uses, and the motor per se forms the subject matter of the present application.

An important object of the present invention is to provide a vacuum motor of the bellows type having movable and stationary heads connected by a bellows the interior of which is connectible to a source of vacuum to actuate the movable head, and to provide novel means for limiting movement of the movable head to normal position and for utilizing such means as the air duct for normally connecting the interior of the motor to the atmosphere.

A further object is to provide such a motor wherein the air duct is provided with a housing having an air cleaner therein, and to utilize such housing as the means for limiting movement of the movable head to its normal position.

A further object is to provide a motor of the character referred to wherein the air duct is rigidly connected to the movable head and is slidable through the stationary head in sealed relation thereto and cooperates with the stationary head to maintain a predetermined relationship between the axis of the movable head and the axis of the stationary head in all positions of the movable head between its normal position and the position which it occupies when the motor is fully energized.

A further object is to provide for carrying by the movable head all of the parts of the valve mechanism which control the energization of the motor, including the provision of a movable control valve element having an air passage directly communicating with the air duct referred to above.

Other objects and advantages of the invention will become apparent during the course of the following description.

In the drawings I have shown one embodiment of the invention. In this showing:

Figure 1 is a side elevation of the motor, parts being broken away, the motor being shown in conjunction with parts of a motor vehicle and brake operating elements associated therewith;

Figure 2 is a rear face view of the motor shown in conjunction with brake operating parts of a motor vehicle;

Figure 3 is an enlarged axial sectional view through the motor and associated elements;

Figure 4 is a section on line 4—4 of Figure 3; and

Figure 5 is a detail perspective view of the spool valve.

The present invention is directed to the motor structure and the control means associated therewith. The motor, however, has been illustrated in conjunction with parts of a motor vehicle and parts of the brake operating mechanism therefor, which form no part of the present invention. The motor is illustrated in Figure 1 as being associated with and supported by the vehicle fire wall 10 having associated therewith forwardly thereof a master cylinder 11. This cylinder has the usual plunger (not shown) operable by a rearwardly extending rod 12. The fire wall also supports a rearwardly extending bracket 13 of generally inverted U section (Figure 2) and comprises a top wall 14 and opposite parallel side walls 15 and 16.

The bracket 13 supports brake operating elements which, as stated, form no part of the present invention. A bolt 18 extends through the side walls 15 and 16 of the bracket and supports a power lever 17 of inverted J shape and comprising a relatively long depending arm 18. At the upper end of this arm is a laterally extending integral portion 19 at the end of which, spaced from the arm 18, is an integral depending arm 20. A pedal lever 22 is provided at its lower end with a pedal pad 23 and has its upper end 24 arranged inwardly of and adjacent the upper end of the arm 18. A plate 25 corresponds in shape to and is spaced from the upper pedal lever end 24 and is fixed in position with respect thereto by rivets 26 and 27.

A rocker 30 is arranged between the plate 25 and lever end 24, and the latter elements together with the rocker 30 are connected to the power lever by a pin 31 passing through both lever arms 18 and 20. The rocker 30 is recessed as at 32 to receive a head 33 carried by the push rod 12. The rocker has a depending finger 35 normally spaced from the rivet 27 when the parts are in normal position as shown in Figure 1. The upper end of the rocker 30 has a finger 36 normally seating against the pivot pin 18 and engaged by one end of a compression spring 37 the other end of which bears against a bracket 38 fixed to the top lever portion 19.

The power lever 17 is operable by a motor forming the subject matter of the present invention and indicated as a whole by the numeral 42. The motor 42 comprises a stationary head 43 (Figure 3) fixed to a stationary depending bracket 44 secured in any suitable manner to the fire wall 10. The stationary wall 43 is provided with a forwardly extending annular flange 45 having its forward extremity mounted in an opening 46 in the fire wall 10 and cushioned with respect to the fire wall as at 47.

The motor further comprises a pressure movable head 50 spaced from the fire wall rearwardly thereof. A bellows 51 is connected between the motor heads and is preferably provided with subtending rings 52 to prevent the radial collapsing of the bellows when vacuum is present in the motor chamber 53 within the bellows.

The motor head 50 carries as an integral part thereof an axial valve housing 55 having a port 56 communicating with a nipple 57 adapted for connection with a flexible hose 57' leading to the intake manifold of the motor vehicle engine as the preferable source of vacuum for operating the motor. The valve housing is provided therein with a sleeve 58 having an external annular groove 59 in fixed communication with the vacuum port 56, and the sleeve is provided therethrough with radial ports 60 communicating with the groove 59. The sleeve 58 is provided in spaced relation to the ports 60 with additional radial ports 61 opening into a chamber 62 in a rearwardly extending annular flange 64 formed integral with the motor head 50. This flange is provided with ports 65 affording fixed communication between the chamber 62 and the motor chamber 53.

The sleeve 58 is maintained in position by a clip 68 which holds the sleeve 58 in its rearward limit of movement in clamping engagement with the peripheral portion of a diaphragm 69 for a purpose to be described.

A spool valve 72 is slidable in the sleeve 58 and is provided with an axial bore 73 communicating through ports 74 with an external groove 75 normally communicating with the sleeve ports 61 and movable out of registration therewith when the motor is energized. The positions of the parts upon initial energization of the motor are shown in Figure 3.

The sleeve valve is further provided with an external axially elongated groove 77 in fixed communication with the ports 60 and normally out of communication with the ports 61, and movable to a position, as in Figure 3, connecting the ports 60 and 61.

As further described below, the axial bore 73 is in fixed communication with the atmosphere and this bore communicates through port 79 with a chamber 80 back of the diaphragm 69, thus maintaining such chamber at atmospheric pressure. A reaction diaphragm 84 has its peripheral portion clamped against the forward edge of the flange 64 by a sheet metal cap 85 secured to the flange 64 by screws 86. The inner edge of the diaphragm 84 is fixed to the valve 72 as at 87, and a spring 88 is interposed between the cap 85 and diaphragm 84 to urge the valve 72 rearwardly to its normal motor de-energizing position. It will be apparent that the rear face of the diaphragm 84 is always subject to pressure present in the chamber 62. The forward face of the diaphragm is always subject to atmospheric pressure, in a manner to be described, in the chamber 90, formed in the cap 85. An axial tube 92 is welded or otherwise secured at its rear end to a cylindrical flange 93 carried by the cap 85. The tube 92 extends through the stationary motor wall 43 and such wall is provided with a deformable double-lipped seal 94 backed up preferably by a rawhide or other deformable seal 95, these seals permitting the tube 92 to alter its position axially of the head 43 during operation of the motor, as will become apparent.

Forwardly of the fire wall 10, the tube 92 carries a preferably stamped casing 98 to which is secured a bumper 99 engageable with the forward end of the flange 45. This bumper, as will become apparent, limits rearward movement of the tube 92 and the elements connected thereto, and silences the arresting of the parts in such normal positions. The casing 98 houses an air cleaner 100 and is provided with a cap 101 apertured as at 102 for the admission of air into the air cleaner. A heavy return spring 104 engages at opposite ends with the motor heads 43 and 50 to urge the head 50 and tube 92 to the normal off positions referred to.

The valve housing 55 is provided with a rearwardly extending ear 105 pivotally connected by a bolt 106 to the lower end of the power lever arm 18. This pin also extends through a slot 107 formed in the pedal lever 22 to provide lost motion connection between the pedal lever and the pin 106. The left-hand side of the slot 107, in the off positions of the parts shown in Figure 1, engages the pin 106, and the pedal lever is movable an appreciable distance from its normal off position independently of the pin 106. The pedal lever 22 carries a disk 109 (Figure 2) through which the slot 107 extends, and this disk is provided with a preferably integral lateral extension 110 extending across and engageable with the central portion 111 of the diaphragm 69, such portion of the diaphragm covering a projecting button 112 formed integral with the valve 72. Such central portion 111 of the diaphragm silences engagement of the projection 110 with the valve, and such projection is operative for moving the valve to energize the motor upon operation of the brake pedal.

*Operation*

The parts normally occupy the positions shown in Figure 1, the valve groove 77 being moved to the right of the ports 61 and these ports being open to the atmosphere through valve ports 74, passage 73, air tube 92 and air cleaner 100. Accordingly the motor chamber 53 will be connected to the atmosphere and the spring 104 will maintain the head 50 in its normal position, to which position movement of the head 30 is limited by engagement of the bumper 99 with the annular flange 45. The bumper 99 forms in effect a part of the air cleaner structure, and accordingly the latter may be considered as the stop means limiting movement of the head 50 to its normal position.

In utilizing the invention in connection with the brake mechanism illustrated, the pedal pad 23 will be depressed and the pedal lever 22 will pivot on the pin 31 without transmitting movement of the push rod 12. The transverse member 110, carried by the pedal lever, will move the valve 72 to the left in Figures 1 and 3, thus moving the valve groove 75 out of registration with the ports 61 and moving the grooves 77 to a position cracking the ports 61 to the vacuum chamber 56. The motor chamber 53 will now be disconnected from the atmosphere and will be connected to the source of vacuum to exhaust air from the motor chamber 53. Atmospheric pressure outwardly of the movable head 50 effects movement of such head to the left, and such movement is transmitted to the power lever through the pin 106. This power lever now starts to turn about the pin 18.

It will be apparent that when the parts were in their off positions, atmospheric pressure will have existed in both diaphragm chambers 62 and 90, and the only force opposing movement of the valve 72 from its off position will be the light spring 88. As soon as the sleeve ports 61 are cracked to the vacuum chamber 56, however, differential pressures will be set up on opposite sides of the diaphragm 84, since air also will be exhausted from the diaphragm chamber 62. Air pressure to the left of the diaphragm 84, therefore, will assist in resisting movement of the valve 72 away from its normal position, and this resistance will be proportional to differential pressures affecting the motor head 50. Initially this resistance will be light as the motor chamber 52 is connected to the vacuum chamber 56 by the mere cracking of the ports 61, and the resistance will increase progressively as motor energization progresses.

As soon as energization of the motor commences, swinging of the power lever 17 about the axis of the pin 18 bodily then moves the pin 31 toward the left in Figure 1. During this movement, the rocker 30 turns until the finger 35 engages the rivet 27. Thereafter, continued energization of the motor causes force to be delivered to the push rod 12 from the pedal lever 22 through rivet 27 and thus to the rocker 30, and from the power lever 17 to the rocker through the pin 31. These combined forces are delivered to the push rod 12, and it will be apparent that a portion of the work is delivered by pressure of the operator's foot and part by the motor 42 in the use of the invention illustrated. After maximum motor energization takes place, the back or right-hand side of the slot 107 in Figure 1 will engage the pin 106, after which the pedal and power levers turn as a unit, as will be apparent.

In the present illustration of the use of the invention the brakes are released by removing the foot from the pedal pad 23, whereupon the spring 88 plus the differential pressures then affecting the diaphragm 84 will immediately move the valve 72 to its normal position shown in Figure 1. The return spring 104 then quickly returns the head 50 to its normal position and when it reaches such position, its movement is arrested by engagement of the bumper 99 with the cylindrical flange 45.

It will be apparent that the motor structure will be advantageous for use in installations other than brake mechanisms where it is desired to power operate some element connected to the head 50 and to control energization of the motor by a pedal or manually operable element engageable with the valve button 112. Where the element to be operated is a lever pivotally connected to the head 50 at a point spaced outwardly thereof, it will be apparent that the substantial weight of the head 50 and the parts carried thereby tends to cause the head 50 to sag or swing downwardly, and this is obviously disadvantageous. Such swinging movement of the head 50 is prevented by the tube 92. This tube is guided by the seals carried by the head 43 and accordingly in any position thereof, the head 50 is caused to maintain a predetermined axial relationship with the head 43. Moreover, the tube 92 provides for the admission of air to the valve mechanism and carries means engageable with the head 43 or some part associated therewith for positively limiting movement of the head 50 to its off position under the influence of the return spring 104. Specifically in the present instance, the stop means for limiting movement of the head 50 is the air cleaner structure, and more specifically the bumper 99 which silences return movement of the motor parts to normal positions. The use of the tube 92 and the air cleaner mounting is also important where it is desirable to silence the rush of air into the motor when the latter is de-energized and where the motor is supported by a wall structure such as the fire wall 10. It will be noted that air is admitted to the interior of the tube 92 from the side of the wall 10 opposite the location of the operator, and accordingly the operator cannot hear at all, or will be hardly conscious of, the sound of air rushing into the motor. The air tube also serves as a practicable means for opening one side of the reaction diaphragm 84 to the atmosphere without separate porting for a diaphragm of this character, it being noted that there is direct communication between the vacuum chamber 90 and the interior of the tube 92. It also will be noted that the axial valve passage 73 is open to the atmosphere without porting the head 50, there being direct communication between the passage 73 and the interior of the air tube 92.

From the foregoing it will be apparent that the present construction provides a motor of simple construction wherein a movable motor head, connected to a bellows, carries all of the control valve parts for controlling energization of the motor, and all of the valve parts accordingly can be assembled relative to the head 50 before connecting the latter to the diaphragm 51. In other words, the head 50 and all of the valve mechanism parts constitute a unit capable of assembly as such with the other parts of the motor. In assembling, the head 50 will be placed in position without being connected to the diaphragm 51, whereupon the adjacent end of the tube 92 may be spot welded or threadedly connected to the flange 93. It then is merely necessary to snap the bellows 42 over the head 50 and place in position the clamping ring employed for securing the bellows to the head 50.

It is to be understood that the form of the invention shown and described is to be taken as a preferred example of the same and that such changes in the shape, size and arrangement of parts may be made as do not depart from the spirit of the invention or the scope of the appended claims.

I claim:

1. A fluid pressure operated motor comprising a stationary head, a movable head spaced therefrom and a bellows connected between said heads, means biasing said movable head away from said stationary head to a normal position, a rigid air tube fixed at one end to said movable head and having its other end projecting through said stationary head in sealed relation thereto, an air cleaner carried by said other end of said tube outwardly of and engaging said stationary head to limit movement of said movable head to said normal position and to filter air entering said tube, a valve mechanism for controlling said motor, comprising a member carried by said movable head and a valve element movable relative to such member, said valve element having a normal position connecting the interior of said motor to the interior of said tube through said sleeve and being movable from said normal position to disconnect the interior of said tube from the interior of said motor and connect the latter to a source of vacuum, and a pressure responsive element having one side subject to pressures in the interior of said motor and having its other side open to atmospheric pressure in said tube, said pressure responsive element being connected to said valve element to oppose movement of the latter away from its normal position with a force proportional to the degree of energization of said motor.

2. A fluid pressure operated motor comprising a stationary head, a movable head spaced therefrom and a bellows connected between said heads, means biasing said movable head away from said stationary head to a normal position, a rigid air tube fixed at one end to said movable head and having its other end projecting through said stationary head in sealed relation thereto, an air cleaner carried by said other end of said tube outwardly of and engaging said stationary head to limit movement of said movable head to said normal position and to filter air entering said tube, a valve mechanism for controlling said motor, comprising a member carried by said movable head and a valve element movable relative to such member, said valve element having a normal position connecting the interior of said motor to the interior of said tube through said sleeve and being movable from said normal position to disconnect the interior of said tube from the interior of said motor and connect the latter to a source of vacuum, and a diaphragm connected at its radially outer and inner edges respectively to said movable head and to said valve element and having opposite faces subject respectively to pressure within said motor and to atmospheric pressure in said tube to oppose movement of said valve element from its normal position with a force proportional to the degree of energization of said motor.

3. A fluid pressure operated motor comprising a stationary head, a movable head spaced therefrom and a bellows connected between said heads, means biasing said movable head away from said stationary head to a normal position, a rigid air tube fixed at one end to said movable head and having its other end projecting through said stationary head in sealed relation thereto, an air cleaner carried by said other end of said tube outwardly of and engaging said stationary head to limit movement of said movable head to said normal position and to filter air entering said tube, a valve mechanism for controlling said motor, comprising a member carried by said movable head and a valve element movable relative to such member, said valve element having a normal position connecting the interior of said motor to the interior of said tube through said sleeve and being movable from said normal position to disconnect the interior of said tube from the interior of said motor and connect the latter to a source of vacuum, said movable head being provided with a variable pressure chamber, a cap fixed to said movable head and to which said one end of said tube is fixed, said cap having therein an atmospheric pressure chamber in constant communication with the interior of said tube, and pressure responsive means connected to said valve element and subject to pressures in said variable pressure chamber and said atmospheric pressure chamber to oppose movement of said valve element away from its normal position with a force proportional to the degree of energization of the motor.

4. A fluid pressure operated motor comprising a stationary head, a movable head spaced therefrom and a bellows connected between said heads, means biasing said movable head away from said stationary head to a normal position, a rigid air tube fixed at one end to said movable head and having its other end projecting through said stationary head in sealed relation thereto, an air cleaner carried by said other end of said tube outwardly of and engaging said stationary head to limit movement of said movable head to said normal position and to filter air entering said tube, a valve mechanism for controlling said motor, comprising a member carried by said movable head and a valve element movable relative to such member, said valve element having a normal position connecting the interior of said motor to the interior of said tube through said sleeve and being movable from said normal position to disconnect the interior of said tube from the interior of said motor and connect the latter to a source of vacuum, said movable head being provided with a variable pressure chamber, a cap fixed to said movable head and to which said one end of said tube is fixed, said cap having therein an atmospheric pressure chamber in constant communication with the interior of said tube, and a flexible diaphragm secured at its radially outer and inner edges respectively to said movable head and to said valve element and dividing said atmospheric and variable pressure chambers to be subject to differential pressures in such chambers to oppose movement of said valve element from its normal position with a force proportional to the degree of energization of the motor.

5. A motor according to claim 4 provided with a spring arranged in said atmospheric pressure chamber and having opposite ends engaging said diaphragm and said cap to bias said valve element to its normal position.

6. A differential fluid pressure operated motor comprising a stationary head, a movable head spaced therefrom and a bellows connecting said heads, a rigid tube having one end fixed with respect to said movable head and its other end projecting through said stationary head in sealed relation thereto, an air cleaner fixed to said other end of said tube to filter air entering said tube, said movable head having a variable pressure chamber in fixed communication with the interior of the motor and having a vacuum chamber in fixed communication with a source of vacuum, a valve sleeve in said movable head having one set of ports communicating with said variable pressure chamber and another set of ports communicating with said vacuum chamber, a valve element slidable in said sleeve and being ported to connect said one set of ports to the interior of said tube when said valve element is in a normal position and being movable from such position to disconnect said one set of ports from the interior of said tube and connect them to said other set of ports to exhaust air from the interior of the motor, and means biasing said valve element to said normal position.

7. A motor according to claim 6 provided with a diaphragm connected at its radially outer and inner edges respectively with said movable head and said valve element and having opposite faces subject to pressures in said variable pressure chamber and to atmospheric pressure in said tube to oppose movement of said valve element from its normal position with a force proportional to the degree of energization of the motor.

8. A motor according to claim 6 provided with a cap carried by said movable head and to which said one end of said tube is fixed, said cap having therein an atmospheric pressure chamber communicating with the interior of said tube, and a diaphragm connected at its radially outer and inner edges respectively to said movable head and said valve element and dividing said variable pressure chamber from said atmospheric pressure chamber to be subject to pressures in such chambers to oppose movement of said valve element from its normal position with a force proportional to the degree of energization of the motor.

9. A differential fluid pressure operated motor comprising a stationary head, a movable head spaced therefrom and a bellows connecting said heads, an element to which power is to be delivered by said movable head, said element having a pivot connecting it to said movable head at a point spaced longitudinally outwardly thereof, means supporting said element for movement of said pivot in a predetermined path, a rigid tube fixed at one end to said movable head and having its other end projecting through said stationary head in sealed relation thereto, an air cleaner carried by said other end of said tube for filtering air entering said tube, and a valve mechanism carried by and arranged in said movable head and comprising a movable valve element having a normal position connecting the interior of said motor to the interior of said tube and movable to disconnect the interior of said tube from said motor and connect the latter to a source of vacuum.

10. A motor according to claim 9 wherein said movable head is provided with a variable pressure chamber in fixed communication with the interior of said motor and a vacuum chamber in fixed communication with a source of vacuum, said valve element in its normal position connecting said variable perssure chamber to the interior of said tube and being movable from such position to connect said variable pressure chamber to said vacuum chamber.

11. A motor according to claim 9 wherein said movable head is provided with a variable pressure chamber in fixed communication with the interior of said motor and a vacuum chamber in fixed communication with a source of vacuum, said valve element in its normal position connecting said variable pressure chamber to the interior of said tube and being movable from such position to connect said variable pressure chamber to said vacuum chamber, a diaphragm connected at its radially outer and inner edges respectively to said head and to said valve element and having opposite faces subject to pressures in said variable pressure chamber and to atmospheric pressure in said tube to oppose movement of said valve from its normal position with a force proportional to the degree of energization of the motor.

12. A motor according to claim 9 wherein said movable head is provided with a variable pressure chamber in fixed communication with the interior of said motor and a vacuum chamber in fixed communication with a source of vacuum, said valve element in its normal position connecting said variable pressure chamber to the interior of said tube and being movable from such position to connect said variable pressure chamber to said vacuum chamber, a cap within said motor fixed to said movable head and to which said one end of said tube is fixed, said cap having therein an atmospheric pressure chamber communicating with the interior of said tube, a diaphragm connected at its radially outer and inner edges respectively to said head and to said valve element and dividing said atmospheric and variable pressure chambers to be subject to differential pressures in such chambers to oppose movement of said valve element from its normal position, and a spring in said atmospheric chamber engageable at opposite ends against said cap and said diaphragm adjacent the radially inner edge thereof to bias said valve element to said normal position.

13. A differential fluid pressure operated motor comprising a stationary head having an axial opening, a movable head spaced from said stationary head and a bellows connecting said heads, a rigid tube fixed at one end to said movable head and projecting through said axial opening with the other end of said tube projecting beyond said stationary head, said axial opening being larger than said tube, deformable packing means carried by said stationary head and through which said tube is slidable in sealed relation, an air cleaner carried by said other end of said tube to filter air entering said tube, a valve mechanism carried by said movable head and comprising a movable valve element having a normal position connecting the interior of said bellows to the interior of said mechanisms where it is desired to power operate some element connected to the head 50 and to control energization of the motor by a pedal or manually operable element engageable with the valve button 112. Where the element to be operated is a lever pivotally connected to the head 50 at a point spaced outwardly thereof, it will be apparent that the substantial weight of the head 50 and the parts carried thereby tends to cause the head 50 to sag or swing downwardly, and this is obviously disadvantageous. Such swinging movement of the head 50 is prevented by the tube 92. This tube is guided by the seals carried by the head 43 and accordingly in any position thereof, the head 50 is caused to maintain a predetermined axial relationship with the head 43. Moreover, the tube 92 provides for the admission of air to the valve mechanism and carries means engageable with the head 43 or some part associated therewith for positively limiting movement of the head 50 to its off position under the influence of the return spring 104. Specifically in the present instance, the stop means for limiting movement of the head 50 is the air cleaner structure, and more specifically the bumper 99 which silences return movement of the motor parts to normal positions. The use of the tube 92 and the air cleaner mounting is also important where it is desirable to silence the rush of air into the motor when the latter is de-energized and where the motor is supported by a wall structure such as the fire wall 10. It will be noted that air is admitted to the interior of the tube 92 from the side of the wall 10 opposite the location of the operator, and accordingly the operator cannot hear at all, or will be hardly conscious of, the sound of air rushing into the motor. The air tube also serves as a practicable means for opening one side of the reaction diaphragm 84 to the atmosphere without separate porting for a diaphragm of this character, it being noted that there is direct communication between the vacuum chamber 90 and the interior of the tube 92. It also will be noted that the axial valve passage 73 is open to the atmosphere without porting the head 50, there being direct communication between the passage 73 and the interior of the air tube 92.

From the foregoing it will be apparent that the present construction provides a motor of simple construction wherein a movable motor head, connected to a bellows, carries all of the control valve parts for controlling energization of the motor, and all of the valve parts accordingly can be assembled relative to the head 50 before connecting the latter to the diaphragm 51. In other words, the head 50 and all of the valve mechanism parts constitute a unit capable of assembly as such with the other parts of the motor. In assembling, the head 50 will be placed in position without being connected to the diaphragm 51, whereupon the adjacent end of the tube 92 may be spot welded or threadedly connected to the flange 93. It then is merely necessary to snap the bellows 42 over the head 50 and place in position the clamping ring employed for securing the bellows to the head 50.

It is to be understood that the form of the invention shown and described is to be taken as a preferred example of the same and that such changes in the shape, size and arrangement of parts may be made as do not depart from the spirit of the invention or the scope of the appended claims.

I claim:

1. A fluid pressure operated motor comprising a stationary head, a movable head spaced therefrom and a bellows connected between said heads, means biasing said movable head away from said stationary head to a normal position, a rigid air tube fixed at one end to said movable head and having its other end projecting through said stationary head in sealed relation thereto, an air cleaner carried by said other end of said tube outwardly of and engaging said stationary head to limit movement of said movable head to said normal position and to filter air entering said tube, a valve mechanism for controlling said motor, comprising a member carried by said movable head and a valve element movable relative to such member, said valve element having a normal position connecting the interior of said motor to the interior of said tube through said sleeve and being movable from said normal position to disconnect the interior of said tube from the interior of said motor and connect the latter to a source of vacuum, and a pressure responsive element having one side subject to pressures in the interior of said motor and having its other side open to atmospheric pressure in said tube, said pressure responsive element being connected to said valve element to oppose movement of the latter away from its normal position with a force proportional to the degree of energization of said motor.

2. A fluid pressure operated motor comprising a stationary head, a movable head spaced therefrom and a bellows connected between said heads, means biasing said movable head away from said stationary head to a normal position, a rigid air tube fixed at one end to said movable head and having its other end projecting through said stationary head in sealed relation thereto, an air cleaner carried by said other end of said tube outwardly of and engaging said stationary head to limit movement of said movable head to said normal position and to filter air entering said tube, a valve mechanism for controlling said motor, comprising a member carried by said movable head and a valve element movable relative to such member, said valve element having a normal position connecting the interior of said motor to the interior of said tube through said sleeve and being movable from said normal position to disconnect the interior of said tube from the interior of said motor and connect the latter to a source of vacuum, and a diaphragm connected at its radially outer and inner edges respectively to said movable head and to said valve element and having opposite faces subject respectively to pressure within said motor and to atmospheric pressure in said tube to oppose movement of said valve element from its normal position with a force proportional to the degree of energization of said motor.

3. A fluid pressure operated motor comprising a stationary head, a movable head spaced therefrom and a bellows connected between said heads, means biasing said movable head away from said stationary head to a normal position, a rigid air tube fixed at one end to said movable head and having its other end projecting through said stationary head in sealed relation thereto, an air cleaner carried by said other end of said tube outwardly of and engaging said stationary head to limit movement of said movable head to said normal position and to filter air entering said tube, a valve mechanism for controlling said motor, comprising a member carried by said movable head and a valve element movable relative to such member, said valve element having a normal position connecting the interior of said motor to the interior of said tube through said sleeve and being movable from said normal position to disconnect the interior of said tube from the interior of said motor and connect the latter to a source of vacuum, said movable head being provided with a variable pressure chamber, a cap fixed to said movable head and to which said one end of said tube is fixed, said cap having therein an atmospheric pressure chamber in constant communication with the interior of said tube, and pressure responsive means connected to said valve element and subject to pressures in said variable pressure chamber and said atmospheric pressure chamber to oppose movement of said valve element away from its normal position with a force proportional to the degree of energization of the motor.

4. A fluid pressure operated motor comprising a stationary head, a movable head spaced therefrom and a bellows connected between said heads, means biasing said movable head away from said stationary head to a normal position, a rigid air tube fixed at one end to said movable head and having its other end projecting through said stationary head in sealed relation thereto, an air cleaner carried by said other end of said tube outwardly of and engaging said stationary head to limit movement of said movable head to said normal position and to filter air entering said tube, a valve mechanism for controlling said motor, comprising a member carried by said movable head and a valve element movable relative to such member, said valve element having a normal position connecting the interior of said motor to the interior of said tube through said sleeve and being movable from said normal position to disconnect the interior of said tube from the interior of said motor and connect the latter to a source of vacuum, said movable head being provided with a variable pressure chamber, a cap fixed to said movable head and to which said one end of said tube is fixed, said cap having therein an atmospheric pressure chamber in constant communication with the interior of said tube, and a flexible diaphragm secured at its radially outer and inner edges respectively to said movable head and to said valve element and dividing said atmospheric and variable pressure chambers to be subject to differential pressures in such chambers to oppose movement of said valve element from its normal position with a force proportional to the degree of energization of the motor.

5. A motor according to claim 4 provided with a spring arranged in said atmospheric pressure chamber and having opposite ends engaging said diaphragm and said cap to bias said valve element to its normal position.

6. A differential fluid pressure operated motor comprising a stationary head, a movable head spaced therefrom and a bellows connecting said heads, a rigid tube having one end fixed with respect to said movable head and its other end projecting through said stationary head in sealed relation thereto, an air cleaner fixed to said other end of said tube to filter air entering said tube, said movable head having a variable pressure chamber in fixed communication with the interior of the motor and having a vacuum chamber in fixed communication with a source of vacuum, a valve sleeve in said movable head having one set of ports communicating with said variable pressure chamber and another set of ports communicating with said vacuum chamber, a valve element slidable in said sleeve and being ported to connect said one set of ports to the interior of said tube when said valve element is in a normal position and being movable from such position to disconnect said one set of ports from the interior of said tube and connect them to said other set of ports to exhaust air from the interior of the motor, and means biasing said valve element to said normal position.

7. A motor according to claim 6 provided with a diaphragm connected at its radially outer and inner edges respectively with said movable head and said valve element and having opposite faces subject to pressures in said variable pressure chamber and to atmospheric pressure in said tube to oppose movement of said valve element from its normal position with a force proportional to the degree of energization of the motor.

8. A motor according to claim 6 provided with a cap carried by said movable head and to which said one end of said tube is fixed, said cap having therein an atmospheric pressure chamber communicating with the interior of said tube, and a diaphragm connected at its radially outer and inner edges respectively to said movable head and said valve element and dividing said variable pressure chamber from said atmospheric pressure chamber to be subject to pressures in such chambers to oppose movement of said valve element from its normal position with a force proportional to the degree of energization of the motor.

9. A differential fluid pressure operated motor comprising a stationary head, a movable head spaced therefrom and a bellows connecting said heads, an element to which power is to be delivered by said movable head, said element having a pivot connecting it to said movable head at a point spaced longitudinally outwardly thereof, means supporting said element for movement of said pivot in a predetermined path, a rigid tube fixed at one end to said movable head and having its other end projecting through said stationary head in sealed relation thereto, an air cleaner carried by said other end of said tube for filtering air entering said tube, and a valve mechanism carried by and arranged in said movable head and comprising a movable valve element having a normal position connecting the interior of said motor to the interior of said tube and movable to disconnect the interior of said tube from said motor and connect the latter to a source of vacuum.

10. A motor according to claim 9 wherein said movable head is provided with a variable pressure chamber in fixed communication with the interior of said motor and a vacuum chamber in fixed communication with a source of vacuum, said valve element in its normal position connecting said variable perssure chamber to the interior of said tube and being movable from such position to connect said variable pressure chamber to said vacuum chamber.

11. A motor according to claim 9 wherein said movable head is provided with a variable pressure chamber in fixed communication with the interior of said motor and a vacuum chamber in fixed communication with a source of vacuum, said valve element in its normal position connecting said variable pressure chamber to the interior of said tube and being movable from such position to connect said variable pressure chamber to said vacuum chamber, a diaphragm connected at its radially outer and inner edges respectively to said head and to said valve element and having opposite faces subject to pressures in said variable pressure chamber and to atmospheric pressure in said tube to oppose movement of said valve from its normal position with a force proportional to the degree of energization of the motor.

12. A motor according to claim 9 wherein said movable head is provided with a variable pressure chamber in fixed communication with the interior of said motor and a vacuum chamber in fixed communication with a source of vacuum, said valve element in its normal position connecting said variable pressure chamber to the interior of said tube and being movable from such position to connect said variable pressure chamber to said vacuum chamber, a cap within said motor fixed to said movable head and to which said one end of said tube is fixed, said cap having therein an atmospheric pressure chamber communicating with the interior of said tube, a diaphragm connected at its radially outer and inner edges respectively to said head and to said valve element and dividing said atmospheric and variable pressure chambers to be subject to differential pressures in such chambers to oppose movement of said valve element from its normal position, and a spring in said atmospheric chamber engageable at opposite ends against said cap and said diaphragm adjacent the radially inner edge thereof to bias said valve element to said normal position.

13. A differential fluid pressure operated motor comprising a stationary head having an axial opening, a movable head spaced from said stationary head and a bellows connecting said heads, a rigid tube fixed at one end to said movable head and projecting through said axial opening with the other end of said tube projecting beyond said stationary head, said axial opening being larger than said tube, deformable packing means carried by said stationary head and through which said tube is slidable in sealed relation, an air cleaner carried by said other end of said tube to filter air entering said tube, a valve mechanism carried by said movable head and comprising a movable valve element having a normal position connecting the interior of said bellows to the interior of said tube and being movable from such position to connect the interior of said bellows to a source of vacuum, and a lever to which power is to be delivered by said movable head, said lever being pivotally connected to said movable head at a point longitudinally outwardly of said movable head and being mounted to turn on a supporting pivot spaced substantially from such point transversely of said movable head.

References Cited in the file of this patent
UNITED STATES PATENTS

| | | |
|---|---|---|
| 1,582,118 | Bragg | Apr. 27, 1926 |
| 1,826,417 | Bragg | Oct. 6, 1931 |
| 1,900,165 | Monge | Mar. 7, 1933 |
| 1,960,481 | Monge | May 29, 1934 |
| 2,207,700 | Porter | July 16, 1940 |
| 2,401,892 | Stelzer | June 11, 1946 |
| 2,667,861 | Rockwell | Feb. 2, 1954 |